Aug. 16, 1966 G. A. CLARK 3,267,267

DIGITAL ELECTRICAL CALCULATING APPARATUS

Filed May 2, 1963 5 Sheets-Sheet 1

INVENTOR.
GORDON A. CLARK
BY
[signature]
AGENT

INVENTOR.
GORDON A. CLARK

DIGITAL ELECTRICAL CALCULATING APPARATUS

Filed May 2, 1963 5 Sheets-Sheet 3

INVENTOR
GORDON A. CLARK

DIGITAL ELECTRICAL CALCULATING APPARATUS

Filed May 2, 1963 5 Sheets-Sheet 4

INVENTOR.
GORDON A. CLARK
BY
Frank R. Jerifan
AGENT

DIGITAL ELECTRICAL CALCULATING APPARATUS

Filed May 2, 1963

INVENTOR.
GORDON A. CLARK

United States Patent Office 3,267,267

Patented August 16, 1966

3,267,267

DIGITAL ELECTRICAL CALCULATING APPARATUS

Gordon Albert Clark, Epsom Downs, England, assignor to North American Philips Company, Inc., New York, N.Y., a corporation of Delaware Filed May 2, 1963, Ser. No. 277,554
Claims priority, application Great Britain, May 4, 1962, 17,243/62
7 Claims. (Cl. 235—164)

This invention relates in general to digital electrical calculating apparatus and is more specifically concerned with such apparatus useful as a multiplier, divider, or square-rooter.

A binary rate multiplier is known in which a train of input pulses is multiplied by a preset fractional number to give an output train of a smaller number of pulses which is a product of the input and the preset fractional quantity. In this device selected pulses from the stages of a binary counter are gated into a common output line by gates which are controlled by the preset quantity. The output of this device is either a rate of pulses or a discrete number; it is a discrete number if the input pulses are limited to a discrete number before reaching the device.

The present invention provides digital electrical calculating apparatus comprising a pulse input terminal for connection to a pulse source, a scaler having a plurality of stages in cascade, a start-stop gate connected between said pulse input terminal and an input terminal of said scaler, selector means for deriving a pulse from each of a number of selected scaler stages on the occurrence therein of any change of state other than a change constituting a carry and for combining said pulses, a counter for counting the latter pulses, and means for setting the start-stop gate to the stop condition in response to occurrence of a predetermined number in said counter or in said scaler. The pulses which thus correspond to the relevant changes in the stages of the scaler will be referred to herein as "non-carry" pulses and those non-carry pulses that are selected for feeding to the counter will be referred to as the "selected" pulses. The non-carry pulses are used in this system because only one of these occurs in the whole scaler for every input pulse.

By contrast with the aforesaid known device, it is advantageous to have, in accordance with the present invention, a counter (referred to herein as A) for the selected pulses and a start-stop gate operated by the circuit itself since these permit discrete digital calculations to be made in a very convenient manner.

Instead of using pre-counted trains of input pulses, an arrangement according to the invention is designed to employ input pulses supplied thereto from a continuous source which is cut off by the start-stop gate when either the counter or the scaler reaches a preset number.

Although it will not be used in all cases, a second counter (referred to as Z) may be provided at the output end of the scaler (referred to as $Zf$) which scaler divides down the input pulses received. An advantage of having a counter for the output of the scaler is that it becomes possible to work in integers as well as fractions and this makes some of the more complicated versions of the device much easier to manipulate. With the arrangements of the known device a divider can only be achieved by means of very much more circuitry than is needed for the device here described.

If the counter A for the selected non-carry pulses contains a number A′ and counter Z contains a number Z′, and if the selector means are referred to as X while the number represented by its setting is referred to as X′, there is a first basic proposition that $X'.Z'=A'$. In order to achieve this multiplication the Z counter is preset at Z′ and used to switch off the start-stop gate, and quantity X′ is preset in the selector means, the answer appearing in counter A.

The arrangement can also be used with means whereby the input pulses are stopped when counter A reaches a preset number rather than counter Z; this case corresponds to a second basic proposition that $$Z'=\frac{A'}{X'}$$

Thus division can be performed by presetting X (as before) and obtaining the answer from the scaler ($Zf$) which, in this case, may have an output counter for the integers as aforesaid.

A third case involving a preset static X unit will also be described. This arrangement is a combined multiplier and divider in which an additional preset selector system (referred to as Y) is provided for performing a second selection from the same scaler non-carry pulses and a second counter (referred to as B) is provided therefor. In this case an integer counter (Z) for the scaler ($Zf$) is not required.

As an alternative to the preset static selector means used in the above three cases, it is possible to construct the selector means as a scaler having the same number of stages as the main scaler and so arranged that its input end corresponds to the output end of the main scaler. Such an arrangement permits the quantity X′ to be changed progressively and automatically and can for example be used (as will be described) to provide square roots; the method adopted is to feed the scaler ($Zf$) output to the selector scaler (X) via a divide-by-two unit and use the output of the selector counter (A) to stop the start-stop gate when A reaches a preset number.

All the specific applications mentioned above can be carried out regardless of the radix adopted. In particular, the radix may be 2 or 10, but the following examples will be described for simplicity on the basis of the radix 2.

A number of specific embodiments of the invention will now be described by way of example with reference to the accompanying drawings in which.

Figure 1:
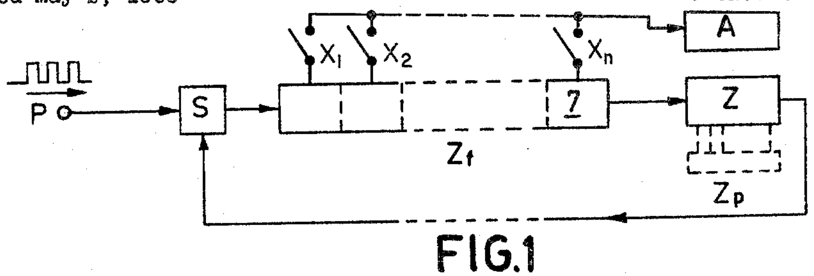
FIGURE 1 is a block-schematic circuit diagram of a multiplier.

Referring now to the drawings and more particularly to FIGURE 1, the apparatus shown comprises a pulse input terminal P for connection to a continuous source of pulses (not shown) and these pulses are passed through a start-stop gate S to the input terminal of a scaler $Zf$ having a plurality of stages in cascade. The selector means are shown schematically at X and include a gate associated with each of the stages of the scaler $Zf$. The individual X (designated $X_1$, $X_2$, . . . $X_n$) gates may be very simple, and may even be constituted by a manual ON-OFF switch so that the digits of a binary number can be preset manually by appropriate manipulation of the switches. Each X gate is connected to an appropriate point of the corresponding Z*f* stage, i.e. a point where the non-carry pulses are produced. The outputs of the X gates are combined at a common point which constitutes the input to a counter A for counting the selected pulses.

If the scaler Z*f* employs for its stages flip-flops which "carry" by means of a negative-to-zero transition and give a negative output for the "1" state, a very simple selector gate can be constructed (for X) with a resistor-capacitor-diode arrangement. The capacitor is connected to the inverted output of a flip-flop in the scaler and the resistor is connected to the inverted output of a controlling flip-flop. To the junction of the resistor and capacitor a diode is connected by its anode with its cathode taken to zero volts via a resistor. With the controlling flip-flop giving 0 v. at its inverted output terminal (i.e. with the flip-flop in the "1" state) the positive edge from the scaler flip-flop which occurs when this flip-flop changes to a "1" (i.e. the transition in which it forms a carry) will be differentiated and passed through the diode.

A negative voltage equivalent to the amplitude of the negative-to-zero transition will hold the diode in the cut-off state and thus prevent the differentiated pulse from passing through the diode. The diode also prevents pulses from other selector gates from passing into the scaler flip-flops, and prevents the passage of the negative-going differentiated pulse which occurs when the scaler flip-flop changes from the "1" state to the "0" state.

The scaler Z*f* (which can only count up to fractional quantities) is followed by a counter Z which counts whole numbers, and this counter Z is used to switch the gate S to the OFF state when a present number has been reached in Z.

The presetting of counter Z can be performed by separate means shown at Z*p* but such means are not necessary if the known technique is adopted whereby the complement of the desired number is set into the counter Z and the counter is then left to run until it is "full" at which point the final carry pulse occurs which actuates the gate S.

As has been explained previously, the multiplication $X'.Z'=A'$ is performed by this circuit and the answer appears at A. Counter A may be of a type in which each stage displays the count reached, in which case the answer can be read off directly. Alternatively, counter A may be connected to a separate indicating or controlling device.

Figure 2:
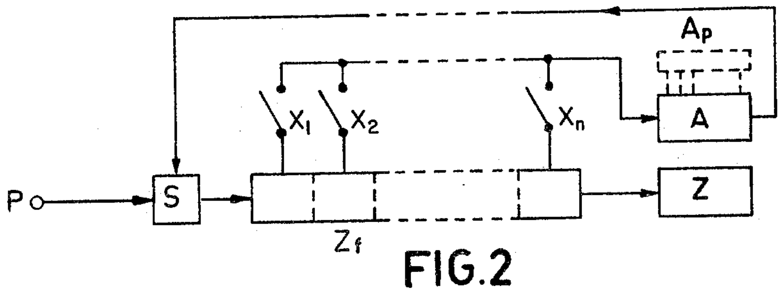
FIGURE 2 is a block-schematic circuit diagram of a divider circuit.

Referring now to FIGURE 2, the circuit elements are similar to those shown in FIGURE 1 except for the fact that it is the counter A and not counter Z which controls the gate S. Thus the counter A and selector X have to be preset and counter A may be preset by separate means A*p* or by the method mentioned for Z of FIG. 1. In this circuit the division $$Z'=\frac{A'}{X'}$$

is performed.

Figure 3:
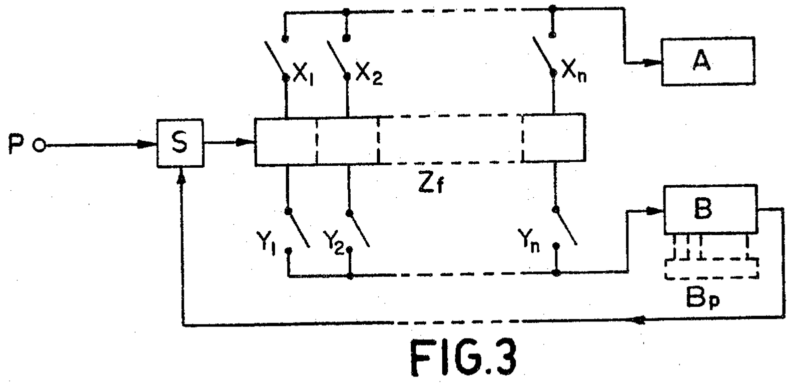
FIGURE 3 is a block-schematic circuit diagram of a multiplier/divider.

Referring now to FIGURE 3, it will be seen that the upper part of the circuit is the same as in FIGURE 1 except for the absence of counter Z (which is not required) and the stop connecton therefrom. Here an additional selector Y is provided which is analogous to the selector system X and feeds a counter B which is analogous to the counter A.

A description will now be given of the combined multiplier/divider of FIGURE 3.

The binary scaler Z*f* is arranged so that the selected non-carry pulses from its stages can be routed via capacitor-resistor-diode selector gates X (or similar circuits) into counters A, B. The gates X feeding counter A are controlled by selector units (e.g. flip-flops) and the pulses fed to counter B are fed from gates Y also controlled by selector units (e.g. flip-flops). Thus, for each complete cycle of the scaler Z*f*, a number X′ of pulses will be routed into A and a number Y′ of pulses will be routed into B.

In the elementary from of the device, X′ and Y′ quantities are coded in pure binary notation and the scaler is also pure binary. However, by using a scaler other than a pure binary and by weighting the selector units (e.g. flip-flops) controlling the selector gates in a manner other than pure binary, it is possible to use e.g. binary coded decimal notations for the X′ and Y′ quantities.

Whatever the form of coding used for X, Y and the scaler, the following equations hold good: $Z'.X'=A'$ and $Z'.Y'=B$. A simple algebraic manipulation gives the proposition that $$A'=\frac{X'}{Y'}\cdot B''$$

so that Z′ disappears and a Z counter is not required after Z*f*.

The B counter is preset by means B*p* so that when a given number B′ is achieved, the counter will close gate S. The answer will then be available at A.

The rounding which is necessary when anything other than a pure binary number is used for the Y′ quantity gives rise to errors which can be considerably reduced by feeding into the scaler a number corresponding to Y′ plus one more significant digit.

Figure 4:
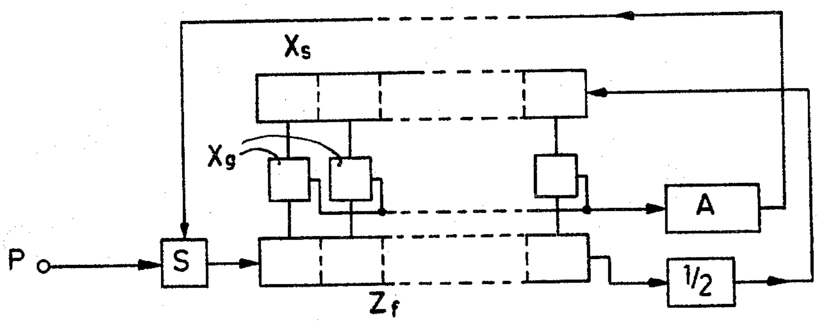
FIGURE 4 is a block-schematic circuit diagram of a circuit for calculating square roots.

Referring now to the square-rooter of FIG. 4, the selector means is constructed as a set of gates X*g* combined with a counter X*s* having the same number of stages as the scaler (Z*f*) and so arranged that its input end corresponds to the output end of Z*f*. Thus the quantity X′ can be changed progressively and automatically by the circuit. For this purpose the output from the scaler Z*f* is divided by 2 and fed into counter X*s* which controls the selector gates X*g* through which the selected non-carry pulses are fed to A.

The first cycle of the scaler Z*f* produces no outputs through the selector gates (which may be capacitor-resistor-diode gates as aforesaid) since the flip-flops in the counter X which controls these gates are all set in the "0" condition which inhibits the passage of these pulses to A.

At the end of the second cycle of the scaler Z*f* a "1" is fed into the controlling counter X*s*. During the next cycle, therefore, a single pulse is fed through the selector gates. During the next cycle another single pulse is fed through the selector gates and at the end of the cycle a second pulse is fed to the controlling counter X*s* which now contains 2.

An examination of the sequence of pulses routed into the controlling counter X*s* and the selected-pulse counter A shows that successive pulses fed into the controlling X*s* counter correspond respectively to the supply of 1, 1+2, 2+3, 3+4, etc. to the counter A, and this series (when added) is a series which gives the square of the number of terms. Thus, the number contained in the counter A is always the square of the number contained in the controlling counter X*s*.

The A counter can be preset to a given number A′ and its output used to stop the gate S. Once the pulses are stopped the square root of A′ can be ascertained by examining the state X′ of the flip-flops in the controlling X*s* counter, i.e. $X'=\sqrt{A'}$.

Figures 5, 6:
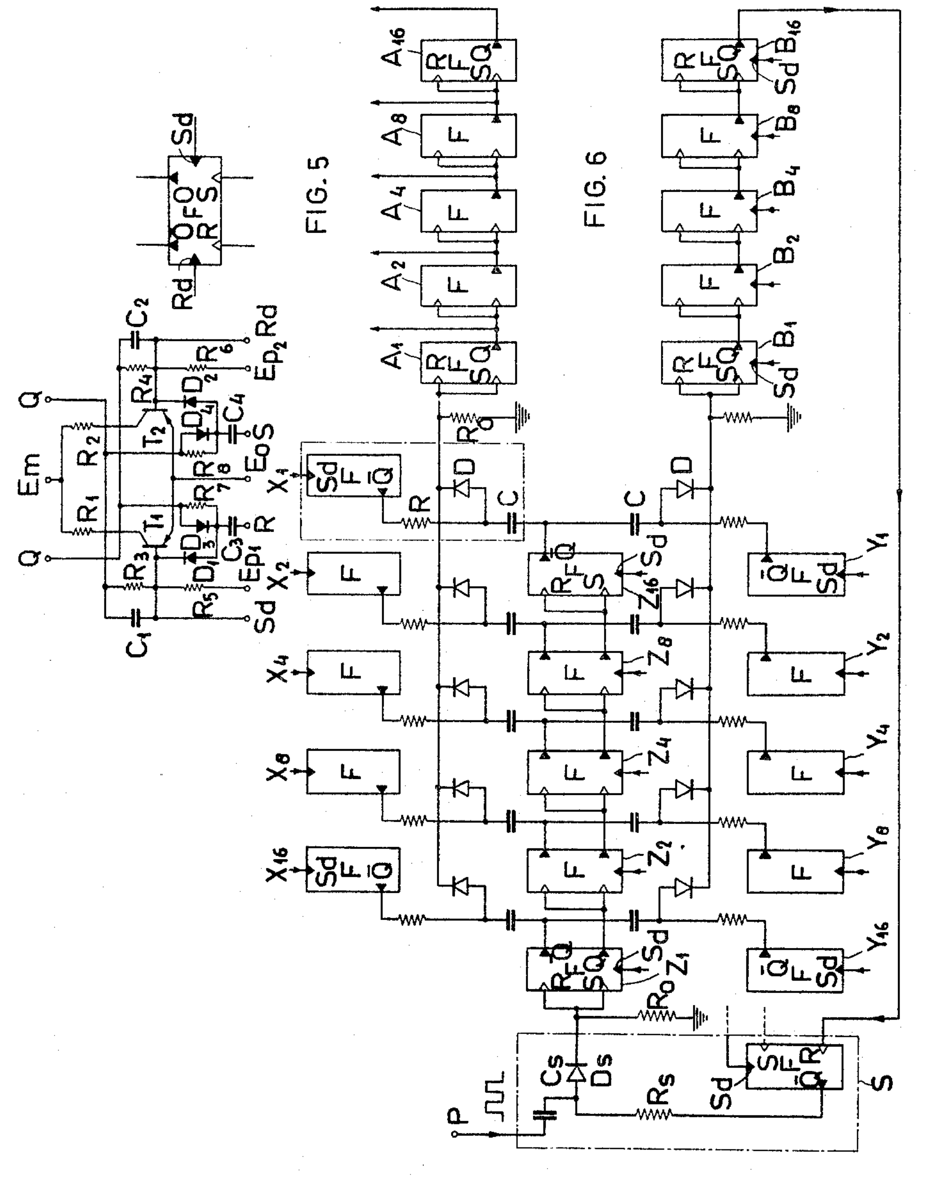
FIGURE 5 is the circuit diagram of a cross-coupled transistor flip-flop circuit suitable for most of the stages in the scalers and counters of FIGURES 1 to 4, and FIGURES 6 to 9 show more detailed examples.

Many of the units and stages of the apparatus of FIGURES 1 to 4 (e.g. the X and Y selector control units and the stages of the scaler and counters) can employ a cross-coupled transistor flip-flop circuit configuration, and FIGURE 5 shows such a configuration which corresponds to the circuit units available commercially as Mullard type FF1 ("Mullard" is a registered trademark). A black-schematic diagram of the circuit (inset of FIGURE 5)

shows some of the circuit connections in accordance with a conventional code, and other data are given below:

*Table I*

Terminal Indications:
- $Q$=direct output
- $S$=set A.C. input
- $R$=reset A.C. input
- $R_D$=reset D.C. input
- $EP_2$=positive supply terminal (+6 v.)
- $Eo$=common supply terminal (0 v.)
- $Ep_1$=positive supply terminal (+6 v.)
- $Em$=negative supply terminal (−6 v.)
- $S_D$=set D.C. input
- $\overline{Q}$=inverted output Such units can readily be connected in cascade to form the necessary counters and scalers, and this can be done (as in the examples described below) by connecting the Q output of one unit directly to the R and S inputs (A.C. set and reset) of the next unit. The Q output alternates between about −6 v. and 0 v. and only the positive-going changes (from −6 v. to 0 v.) affect the next stage; the latter is arranged in known manner so that its diodes D1–D2 route a positive-going input transient to the base of that transistor which happens to be bottomed.

A detailed example of a multiplier-divider based on FIGURE 3 is shown in FIGURE 6 where all the units marked "F" are flip-flops which can be of the type shown in FIGURE 5 (the terminals are marked in the same way as the inset of FIGURE 5, unused terminals being omitted for simplicity). The X and Y gates each comprise a resistor-capacitor-diode arrangement as described earlier (elements R, D, C) combined with a controlling flip-flop (this grouping is indicated once, for gate XI and is shown enclosed in broken lines).

In this example scaler $Zf$ comprises five flip-flops (labelled Z1, Z2, Z4, Z8, Z16) and is fed from a square-wave pulse source through a terminal P and a start/stop gate S. Considering first the X selector flip-flops (labelled X1, X2, X4, X8 and X16), the non-carry pulses from the $\overline{Q}$ terminals of the Z flip-flops are differentiated by the capacitors and resistors and fed through the diodes, provided that the $\overline{Q}$ terminals of the X flip-flops are at approximately 0v. Any of the X flip-flop $\overline{Q}$ terminals which are at −6 v. cut off the respective diodes and consequently prevent the pulses going through the diodes. Considering the complete cycle of the $Zf$ scaler, for every 32 pulses fed in 16 pulses are available on the $\overline{Q}$ terminal of the first flip-flop, 8 on the second, 4 on the third, and so forth. Thus by setting X16 to "1" (giving 0 v. on the $\overline{Q}$ terminal) 16 out of every 32 pulses are passed through the diode. By setting X8 to "1" (and its $\overline{Q}$ terminal to 0 v.) 8 pulses are allowed through the diode out of every 32 fed into the scaler. By appropriate choice of inputs the X flip-flops any number of pulses between 1 and 31 out of every 32 can be routed into the A counter (A1 to A16).

The Y selector flip-flops Y1 to Y16 perform a similar function on the pulses which are routed into the B counter. Thus for every 32 pulses fed into the scaler flip-flops a number between 1 and 31 can be selected and fed to the B counter (B1 to B16).

For every complete cycle of the $Zf$ scaler, then, $x$ pulses are fed into the counter A and $y$ pulses are fed into counter B. Thus $x.a=y.b$. In the arrangement shown the binary complement of a number is fed into the counter B which is then filled with pulses from the Y-controlled gates until it overflows and carries, giving a stop signal (via the stop line) to the flip-flop in the S gate between the pulse source and the $Zf$ scaler.

At the conclusion of the operation the number contained in the A counter is equal to $b$ times $x/y$. Thus simultaneous multiplication and division has been accomplished by the use of this device.

If the F units are of the Mullard type referred to above, the other components may have the values given below:

*Table II*

Diodes (D, D$s$)=Mullard type OA85 or OA95
Resistors (R, R$s$, R$o$)=20–22K
Capacitors (C, C$s$)=1500 pf.

Figure 7:
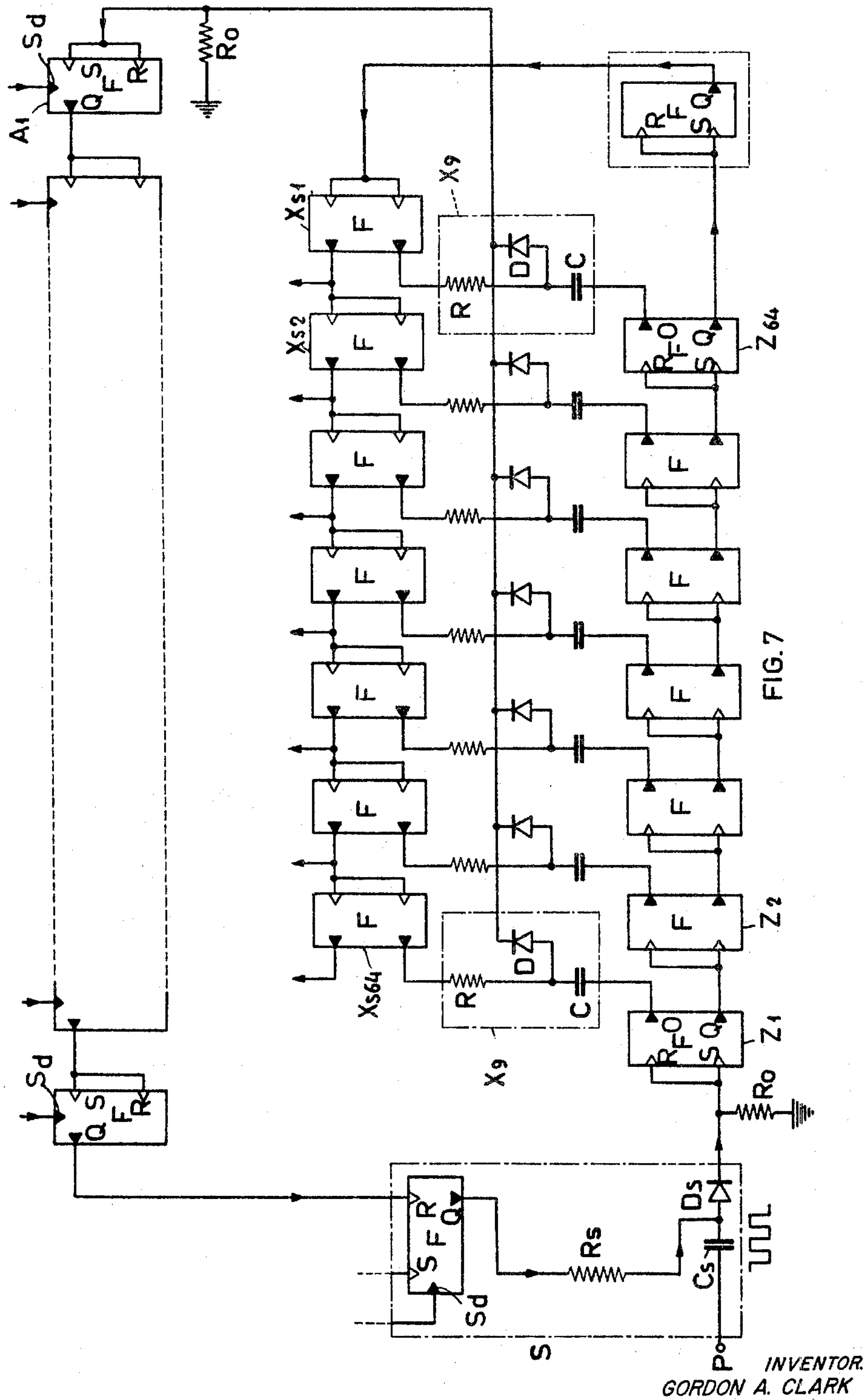

FIGURE 7 shows in detail the circuit of a binary square-rooter based on the arrangement of FIGURE 4. As in the case of FIGURE 6, all the units marked F are flip-flops which may be of the type described with reference to FIGURE 5. Each of the gates X$g$ is a resistor-capacitor-diode arrangement (R, C, D) as used e.g. in the X units of FIGURE 6. Each X$g$ gate is controlled by one stage (X$s$1 etc.) of the X$s$ selector counter, the stages thereof employing F flip-flop units.

In the example shown, seven flip-flops form a divide-by-128 scaler $Zf$ fed from a pulse source via a start-stop gate S and their non-carry pulses are selected by means of seven other flip-flops (X$s$1–X$s$64) controlling the resistor-capacitor-diode gates RCD. However, in this example the final carry output from the divide-by-128 scaler $Zf$ is fed to a further divide-by-2 stage, and then fed to the controlling flip-flops which are here arranged as cascaded stages forming counter X$s$. It should be noted that the least significant flip-flop in the controlling counter X$s$ corresponds to the most significant flip-flop in the scaler $Zf$, and the most significant flip-flop in the controlling counter to the least significant flip-flop in the scaler.

When the flip-flop of the start/stop gate S is turned to the "start" condition and pulses are allowed to flow into the scaler $Zf$, a carry is fed into the divide-by-2 flip-flop after 128 pulses, but during the course of this 128-pulse cycle no pulses are routed through the gates since all the controlling flip-flops are in the 0 state. After a further 128 pulses into the scaler $Zf$ a second carry pulse is fed to the divide-by-2 stage and this gives rise to a carry from there into the least significant flip-flop in the controlling counter X$s$. During the next 128-pulse cycle, therefore, a single pulse will be routed into the 14-stage binary counter A. At the end of the third 128-pulse cycle another carry will be fed into the divide-by-2 stage, and during the fourth 128-pulse cycle another single pulse will be routed into the 14-stage A counter. At the end of the fourth 128-pulse cycle the carry will be fed into the divide-by-2 stage and on to the controlling counter X$s$ which now contains the number 2, i.e. a one in the second flip-flop, and hence during the course of the 5th cycle two pulses will be routed into the 14-stage A counter. If this process is continued it will be seen that for successive pulses into the control counter X$s$ a series of pulses as follows is fed into the 14-stage A counter:

1st pulse into X$s$ counter=1 pulse into A counter
2nd pulse into X$s$ counter=3 pulse into A counter
3rd pulse into X$s$ counter=5 pulse into A counter
4th pulse into X$s$ counter=7 pulse into A counter and so forth.

The sum of pulses accumulated in the A counter therefore equals 1+3+5+7 etc. and the sum of this series equals the square of the number of terms in the series. Consequently the number contained in the controlling X$s$ counter is always the square root of the number contained in the A counter. By pre-setting the A counter so that it operates the stop gate S on the attainment of that preset number, it is possible to find square roots, these being contained in the controlling X$s$ counter.

The values of the circuit components may be the same as given in Table II for the circuit of FIGURE 6.

The circuits of FIGURES 6 and 7, in the form shown, can operate at speeds of about 20 kc. Higher speeds can readily be achieved by adding a buffer amplifier stage between diodes D and counter A and changing the values of resistors R to about 6.8K and capacitors C to about 680 pf.

The arrangements of FIGURES 6 and 7 are pure binary arrangements. Two examples of coded binary arrangements will now be described.

Figure 8:
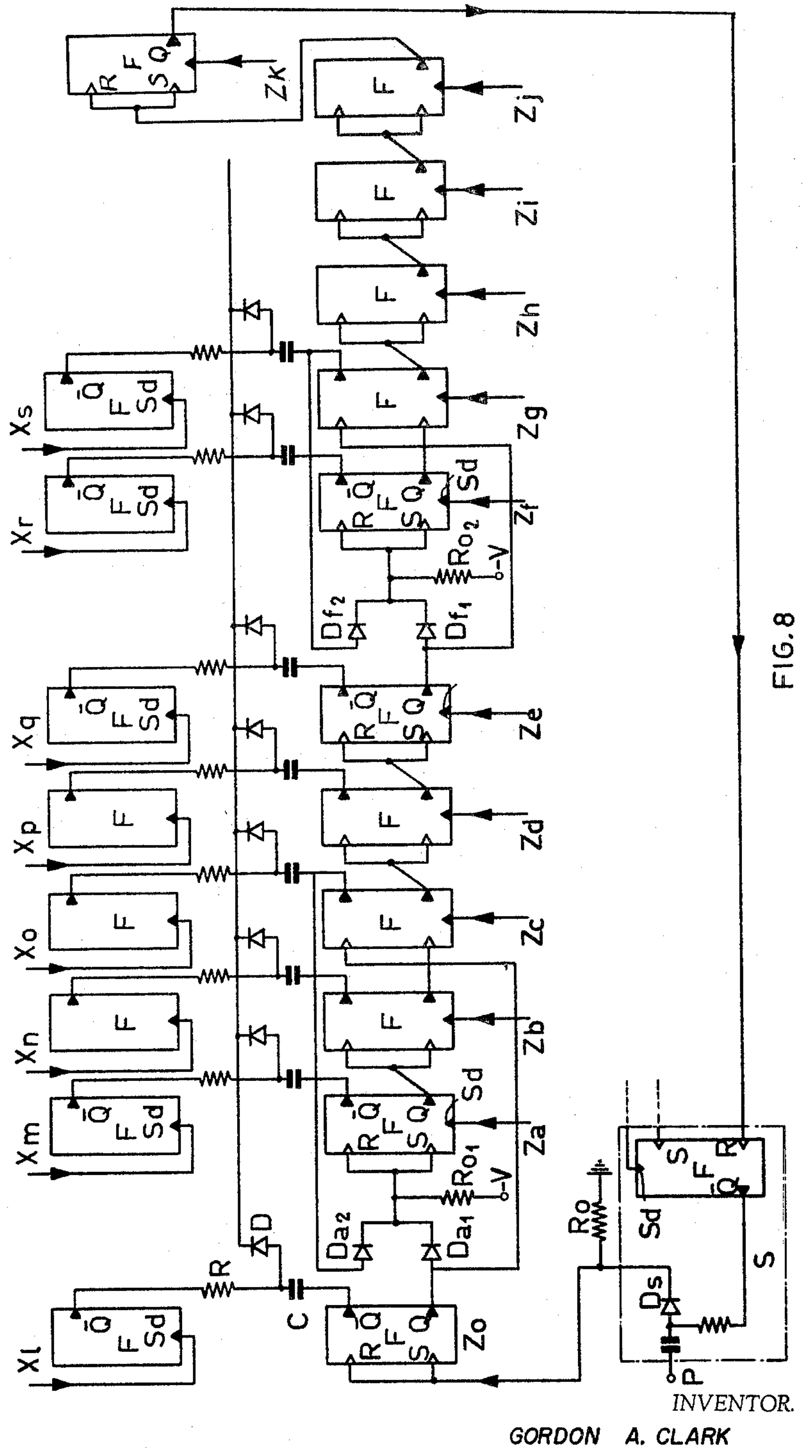

FIGURE 8 shows a multiplier (analogous to that of FIGURE 1) for calculating costs in terms of time and rates of pay expressed in pounds sterling, shillings and pence.

In the arrangement of FIGURE 8, input pulses are fed via gate S to a scaler $Zf$ which comprises a divide-by-two stage $Zo$ followed by a divide-by-5 circuit (ZA, ZB, ZC, DA1, DA2) two divide-by-two stages (ZD and ZE), and a divide-by-3 circuit (ZF, ZG, DF1, DF2). This $Zf$ scaler is extended by a Z counter for the units which counter has four divide-by-2 stages ZH–ZK. Considering now the scaler $Zf$ formed by flip-flop ZO–ZG, this forms a divider-by-120 with the output from the first flip-flop in the chain giving 60 pulses per cycle, the second flip-flop giving 24 pulses per cycle, the third flip-flop giving 12 pulses per cycle, the 4th flip-flop giving 12 pulses per cycle, the 5th flip-flop giving 6 pulses per cycle, the 6th flip-flop giving 3 pulses per cycle, the 7th giving 1 pulse per cycle and from the 8th also 1 pulse per cycle. ZO acts in effect as a ½-minute stage to equalize the radices of the Z and X systems at 120.

The control flip-flops (XL to XS) for this divide-by-120 scaler can hence be weighted so that the first (XL) rerpesents 5 s.–d. per cycle, the second (XM) 2 s.–d. per cycle, the third 1 s.–d. per cycle, the fourth 1 s.–d. per cycle, the fifth 6 d. per cycle, the sixth 3 d. per cycle, the seventh 1 d. and eighth (XS) 1 d. per cycle. Thus if the pulses being fed into the $Zf$ scaler are considered as being equivalent to ½-minute pulses, one complete cycle of the scaler is equivalent to 1 hour and the rate per hour can be set up on the controlling X flip-flops in terms of coded shillings and pence. For dealing with fractions of an hour the flip-flops in the scaler shown as "minutes" and "minutes × 10" can be fed with the complement of the number of minutes and complement of the number of 10's of minutes; depending upon the amount initially set into flip-flops ZA to ZG, the correct fraction of the shillings and pence set in the X flip-flops will have been passed through the diodes D to the output counters (not shown) by the time that the flip-flops ZA to ZG reach the end of their cycle and produce a carry at the Q terminal of ZG. The flip-flops ZH to ZK are preset with the complement of the number (of hours) required as in the case of the simple multiplier circuit of FIGURE 1 and hence it is possible to do multiplication both of integers and fractions, provided that the fractions of the multiplier can be arranged as in the above example to correspond with the radices used in the multiplicand (in this instance the shillings and pence).

All the diodes can be of the aforesaid Mullard types OA85 or OA95, and the R–C–D and S gates may have the same values as for FIGURES 6–7. Resistors $Ro1$, $Ro2$ may have the value 12K. The grouping of stages to form divide-by-5 and divide-by-3 circuits are of known type. Voltage −v. may be −6 volts.

Figure 9:
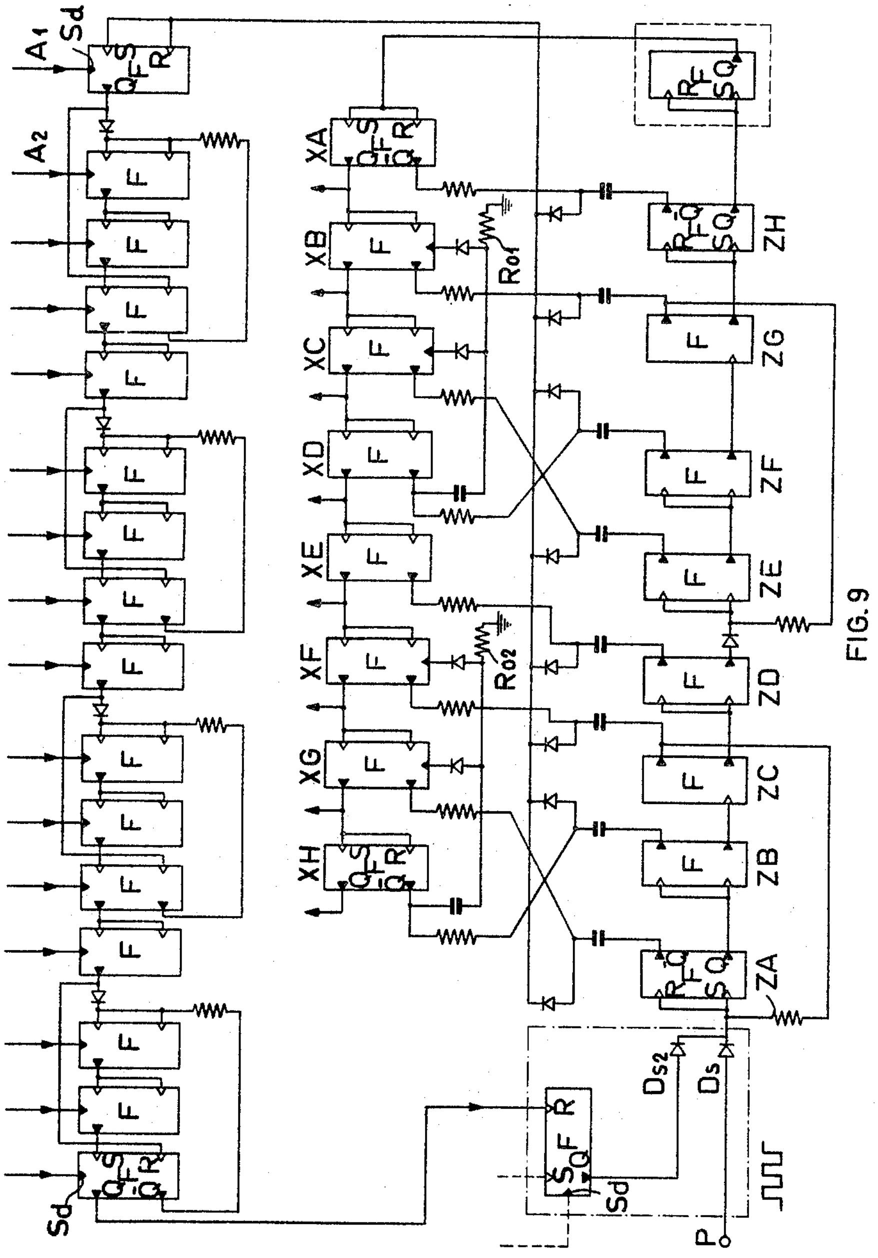

In order to ascertain the square roots of numbers in decimal form it is more convenient to work in binary coded decimal and in the arrangement shown in FIGURE 9 two stages of decimal scaler are used (ZA–ZD and ZE–ZH) together with two stages of decimal division in the controlling X counter (XA–XD and XE–XH).

When using multipliers of this character the number of non-carry pulses produced by a flip-flop in the course of a cycle of the scaler must be equivalent to the "weighting" of the controlling flip-flop. One method of achieving this is as follows.

The scaler decades each consist of a divide-by-5 circuit (ZA–ZC or ZE–ZG) followed by a divide-by-2 stage (ZD or ZH) with the divide-by-5 circuits using gating to inhibit the carry into the first flip-flop after 4 pulses and allowing the 5th pulse to reset a third flip-flop. Such a counter produces (for every 10 input pulses) 4 non-carry pulses from the first flip-flop, 2 non-carry pulses from the second flip-flop, 2 non-carry pulses from the third flip-flop, and 1 non-carry pulse from the fourth flip-flop. For the controlling $Xs$ counter a decade with feedback is used so that on the attainment of the 8th stage the second and third flip-flops in the decade are set to "1." A counter of this sort has the weighting 2, 4, 2, 1, and, by crossing the connections between the two most significant stages of the scaler decades and the two most significant stages in the controlling counter, it is possible to match the number of non-carry pulses in the scaler with the weighting of the flip-flops in the controlling counter.

The method of operation (apart from the different coding) is the same for this square-rooter as for the pure binary square-rooter of FIGURE 7, and in this case the number for which the square root is required is fed (as a complement) into the four decade circuits forming the A counter. When these overflow the start/stop gate S is returned to the stop condition by the output of counter A.

In this case $Ds$ acts also as part of divide-by-5 circuit ZA–ZC and therefore a diode $Ds2$ replaces $Rs$, $Cs$ is removed and the input pulse levels must be 0 v. and −6 v. (for a 6 v. H.T.). Otherwise the values and components of the S and R–C–D gates may be the same as for previous examples, and resistors $Ro1$–$Ro2$ may have the value 12K. The additional diodes used for the divide-by-5 circuits may be of the same type as the other diodes and the resistors shown therein may be of 20–22K.

Greater speeds can be achieved for the circuits of FIGURES 8–9 by inserting a buffer amplifier stage between diodes D and counter A and changing a few values in a manner analogous to that mentioned for FIGURES 6–7.

While the invention has been described with respect to specific embodiments, variations and modifications thereof will be readily apparent to those skilled in the art without departing from the inventive concept, the scope of which is set forth in the appended claims.

What we claim is:

1. Digital electrical calculating apparatus comprising a pulse input terminal for connection to a pulse source supplying a continuous train of pulses, a scaler having a plurality of stages in cascade, a start/stop gate connected between said pulse input terminal and an input terminal of said scaler, selector means for deriving a pulse from each of a number of selected scaler stages on the occurrence therein of any change of state other than a change constituting a carry and for combining said pulses, a counter for counting the latter pulses, and means for setting the start/stop gate to the stop condition in response to occurrence of a predetermined number in said counter or in said scaler whereby the supply of pulses to said scaler is stopped when said predetermined number is reached.

2. A multiplier comprising: a pulse input terminal for connection to a pulse source supplying a continuous train of pulses, a scaler having a plurality of stages in cascade, a start/stop gate connected between said pulse input terminal and an input terminal of said scaler, selector means for deriving a pulse from each of a number of selected scaler stages on the occurrence therein of any change of state other than a change constituting a carry and for combining said pulses, a first counter for counting the latter pulses, the output of said scaler being fed to a second counter having means for presetting therein an integral number and means for setting the start/stop gate to the stop condition in response to occurrence of said preset integral number in said second counter whereby the supply of pulses to said scaler is stopped when said preset integral number is reached.

3. A divider comprising: a pulse input terminal for connection to a pulse source supplying a continuous train of pulses, a scaler having a plurality of stages in cascade, a start/stop gate connected between said pulse input terminal and an input terminal of said scaler, selector means for deriving a non-carry pulse from each of a number of selected scaler stages on the occurrence therein of any change of state other than a change constituting a carry and for combining said non-carry pulses, a first counter for counting the latter pulses, the output of said scaler being fed to a second counter, said first counter being presettable to a given number, and means for setting the start/stop gate to the stop condition in response to occurrence of the preset number in said first counter whereby the supply of pulses to said scaler is stopped when said preset number is reached.

4. A combined multiplier and divider comprising: a pulse input terminal for connection to a pulse source supplying a continuous train of pulses, a scaler having a plurality of stages in cascade, a start/stop gate connected between said pulse input terminal and an input terminal of said scaler, first selector means for deriving a non-carry pulse from each of a number of selected scaler stages on the occurrence therein of any change of state other than a change constituting a carry and for combining said non-carry pulses, a first counter for counting the non-carry pulses from said first selector means, second selector means for deriving a non-carry pulse from each of a number of selected scaler stages, a second counter for counting the non-carry pulses selected by said second selector means, said first or second counter being presettable to a given number, and means for setting the start/stop gate to the stop condition in response to occurrence of said preset number whereby the supply of pulses to said scaler is stopped when said preset number is reached.

5. Apparatus for extracting square roots, comprising: a pulse input terminal for connection to a pulse source supplying a continuous train of pulses, a main scaler having a plurality of stages in cascade, a start/stop gate connected between said pulse input terminal and an input terminal of said main scaler, a selector scaler having the same number of stages as said main scaler for deriving a pulse from each of a number of selected main scaler stages on the occurrence therein of any change of state other than a change constituting a carry and for combining said pulses, the input end of the selector scaler corresponding to the output end of the main scaler, means for feeding the main scaler output to the input of the selector scaler through a divide-by-two unit, a counter for counting the latter pulses, said counter being presettable to a given number, and means for setting the start/stop gate to the stop condition in response to occurrence of the preset number in said counter whereby the supply of pulses to said scaler is stopped when said preset number is reached.

6. Apparatus as claimed in claim 1 for binary operation wherein the selector means comprise controlling flip-flops and the scaler utilizes for its stages flip-flops which "carry" by means of a negative-to-zero transition and give a negative output for the "1" state, and wherein each selector gate is a resistor-capacitor-diode arrangement wherein the capacitor is connected to the inverted output of a flip-flop in the scaler and the resistor is connected to the inverted output of a controlling flip-flop, the diode anode being connected to the junction of the resistor and capacitor, the diode cathode being grounded through a resistor.

7. Apparatus as claimed in claim 4 for binary operation wherein the selector means comprise controlling flip-flops and the scaler utilizes for its stages flip-flops which "carry" by means of a negative-to-zero transition and give a negative output for the "1" state, and wherein each selector gate is a resistor-capacitor-diode arrangement wherein the capacitor is connected to the inverted output of a flip-flop in the scaler and the resistor is connected to the inverted output of a controlling flip-flop, the diode anode being connected to the junction of the resistor and capacitor, the diode cathode being grounded through a resistor.

References Cited by the Examiner

UNITED STATES PATENTS 3,126,476 3/1964 Pariser et al. ---------- 235—164

ROBERT C. BAILEY, *Primary Examiner.*

G. D. SHAW, *Assistant Examiner.*